United States Patent [19]
Hesse et al.

[11] Patent Number: 5,293,473
[45] Date of Patent: Mar. 8, 1994

[54] SYSTEM AND METHOD FOR EDITING A STRUCTURED DOCUMENT TO MODIFY EMPHASIS CHARACTERISTICS, INCLUDING EMPHASIS MENU FEATURE

[75] Inventors: Eric M. Hesse, Gaithersburg; Kathleen E. McGill, Bethesda, both of Md.

[73] Assignee: International Business Machines Corporation, Armonk, N.Y.

[21] Appl. No.: 31,052

[22] Filed: Apr. 20, 1993

Related U.S. Application Data

[63] Continuation of Ser. No. 516,373, Apr. 30, 1990, abandoned.

[51] Int. Cl.$^5$ .................................. G06F 15/00
[52] U.S. Cl. .................................. 395/146; 395/148; 395/144; 395/145; 364/419.1; 364/419.17; 364/943; 364/943.1; 364/943.43; 364/DIG. 2
[58] Field of Search ........ 395/800, 700, 600, 144–149; 364/419.06, 419.07, 419.1, 419.14, 419.17

[56] References Cited

U.S. PATENT DOCUMENTS

| | | | |
|---|---|---|---|
| 4,393,463 | 7/1983 | Aiken, Jr. ............................. | 395/146 |
| 4,454,576 | 6/1984 | McInroy et al. .................... | 395/145 |
| 4,475,239 | 10/1984 | Van Raamsdonk ................. | 382/57 |
| 4,481,603 | 11/1984 | McCaskill et al. .................. | 395/149 |
| 4,539,653 | 9/1985 | Bartlett et al. ....................... | 364/419 |
| 4,633,430 | 12/1986 | Cooper ................................ | 364/419 |
| 4,685,060 | 8/1987 | Yamano et al. ..................... | 364/419 |
| 4,686,649 | 8/1987 | Rush et al. .......................... | 364/419 |
| 4,713,754 | 12/1987 | Agarwal et al. .................... | 395/600 |
| 4,736,308 | 4/1988 | Heckel ................................. | 364/518 |
| 4,739,477 | 4/1988 | Barker et al. ........................ | 395/600 |
| 4,843,593 | 6/1989 | Yanuru et al. ....................... | 364/419 |
| 4,918,648 | 4/1990 | Taguchi et al. ..................... | 364/419 |
| 4,931,783 | 6/1990 | Atkinson ............................. | 340/710 |
| 5,040,131 | 8/1991 | Torres ................................. | 364/521 |
| 5,043,936 | 8/1991 | Majima ............................... | 395/275 |
| 5,079,700 | 1/1992 | Kozoll et al. ....................... | 395/700 |
| 5,113,341 | 5/1992 | Kozol et al. ........................ | 364/419 |
| 5,140,521 | 8/1992 | Kozol et al. ........................ | 364/419 |
| 5,157,768 | 10/1992 | Hoeber et al. ...................... | 395/157 |

Primary Examiner—Alyssa H. Bowler
Assistant Examiner—Alpesh M. Shah
Attorney, Agent, or Firm—John E. Hoel

[57] ABSTRACT

A data processing system and method are disclosed for editing a text document stored as an alphanumeric string of structured document text and displayed as WYSIWYG text. The invention enables changing emphasis characteristics of a marked area of the WYSIWYG text located within a parent structure of the document. The method displays an emphasis menu of the valid emphasis types for the particular parent structure, indicating which ones of the emphasis types are present in the marked area. The method enables deleting an emphasis type from the marked area and will then remove the displayed present indication in the emphasis menu corresponding to the emphasis type deleted from the marked area. The method also enables adding an emphasis type to the marked area and will then display a present indication in the emphasis menu corresponding to the emphasis type added to the marked area.

2 Claims, 5 Drawing Sheets

FIG. 2

```
<P>...
Hi!<U> <I>     <O> <C>THIS IS THE MARKED AREA,
012 3 4    5    6 7 8 9 1 1 1 1 1 1 1 1 1 1 2 2 2 2 2 2 2 2 2 2
                      0 1 2 3 4 5 6 7 8 9 0 1 2 3 4 5 6 7 8 9

</C> ONLY PART OF WHICH IS IN COLOR. </O> </I>
3  3 3 3 3 3 3 3 3 4 4 4 4 4 4 4 4 4 4 5 5 5 5 5 5 5 5 5 5 6 6        6 6
0  1 2 3 4 5 6 7 8 9 0 1 2 3 4 5 6 7 8 9 0 1 2 3 4 5 6 7 8 9 0 1        2 3

THIS IS OUTSIDE THE MARK . </U>                 ... </P>
6 6 6 6 6 7 7 7 7 7 7 7 7 7 7 8 8 8 8 8 8 8 8 8 8 9
4 5 6 7 8 9 0 1 2 3 4 5 6 7 8 9 0 1 2 3 4 5 6 7 8 9
```

↗ 93 (marked area box containing tags 90)
↗ 91

LOCATION OF MARKED AREA ↗ 92

| BEGIN | END |
|-------|-----|
| 5     | 63  |

PARENT STRUCTURE 98

<PARAGRAPH>

EDITABLE EMPHASIS TAGS IN MARKED AREA ↗ 94

| ID | BEGIN | END |
|----|-------|-----|
| I  | 4     | 63  |
| O  | 5     | 62  |
|    |       |     |
|    |       |     |
|    |       |     |

PARENT STRUCTURE MAKING TAG ILLEGAL ↗ 96

| EMPHASIS    | PARENT           |
|-------------|------------------|
| BOLD        | NONE             |
| COLOR       | NONE             |
| ITALIC      | NONE             |
| MONOSPACE   | <TITLE>          |
| OVERSTRIKE  | NONE             |
| SUBSCRIPT   | NONE             |
| SUPERSCRIPT | NONE             |
| SYMBOL      | <TITLE>, <HEADING> |
| UNDERSCORE  | <TITLE>          |

STRUCTURED DOCUMENT TEXT AND DATA 112

SYSTEM AND METHOD FOR EDITING A STRUCTURED DOCUMENT TO MODIFY EMPHASIS CHARACTERISTICS, INCLUDING EMPHASIS MENU FEATURE

This is a continuation of application Ser. No. 07/516,373 filed Apr. 30, 1990, now abandoned.

BACKGROUND OF THE INVENTION

1. Technical Field

The invention disclosed broadly relates to electrical computers and data processing systems and more particularly relates to data processing systems and methods for editing structured document text.

2. Background Art

Modern word processing and text editing programs employ structured document architecture to provide greater control and flexibility in the displayed and printed appearance of documents prepared with the programs. Structured document architecture is described, for example, in the below referenced U.S. patent application by Bennett, et al. A structured document can be prepared in accordance with the Standardized General Markup Language, such as is described in the International Standards Organization, Standard 8879-1986. A data stream of text marked up in accordance with the Standardized General Markup Language, will have its text divided into elements consisting of a begin tag and its content and terminated by an end tag, when necessary. Within a WYSIWYG (what you see is what you get) editor, text is displayed to the user as it will appear when it is printed, even though its structure is defined by the begin tags and end tags for each element of text. Formatting of the elements within a structured document is done when the document is displayed to the user. Those elements which fall into the category of commonly used elements include paragraphs, simple lists, ordered lists, bulleted lists, list items, headings, and document titles. A hierarchical structure can be attributed to these various elements, such as assigning the title element as having the highest level in a hierarchy, assigning a chapter heading as having a next highest level in the hierarchy, and assigning a paragraph element as having a third highest level in an example structured document hierarchy.

Modern displays and printers are capable of representing strings of text in highlighted conditions, which are generally referred to as "emphasis." Example types of emphasis include bold face, color, italic, monospace font, overstrike, subscript, superscript, underscore, and other defined symbols. In a structured document architecture, the portion of the displayed and printed text which will be emphasized by a particular type of emphasis, will be defined by a begin tag and an end tag which characterizes the type of emphasis.

In a structured document architecture having emphasis display capability, if the text displayed on the display unit during the editing operation is in the WYSIWYG form, existing emphasis begin and end tags which are embedded in the structured document text, will not have their positions precisely shown on the display screen. Thus, during editing operations, when the user wishes to delete existing emphasis characteristics by removing the corresponding emphasis begin and end tags, the user's ability to distinguish the exact location of each respective tag will be impaired by the tags having been concealed in the WYSIWYG display. If the user fails to remove both the begin tag and the end tag corresponding to the emphasis characteristic to be removed, the editing operation will be incomplete. Another problem occurs when the user wishes to have two or more forms of emphasis for the same portion of text. The user must be able to accurately place both the begin tag and the end tag for an added emphasis characteristic at the desired locations in the structured document text. However, since WYSIWYG display conceals the exact location in which the begin tag and end tag need to be placed, an incomplete operation will occur.

An additional consideration must be given to those structured document architectures which prohibit certain types of emphasis occurring for particular types of parent document structures. For example, many structured document architectures will prohibit the use of the overstrike form of emphasis in a title or a chapter heading. Unless the user has a detailed understanding of the structured document architecture, it is likely that mistakes will be made in attempting to add emphasis characteristics to prohibited parent structures in a document.

3. Related Patent Applications

The following patent applications serve to describe the background of the invention and are incorporated herein by reference:

U.S. patent application Ser. No. 344,322, filed Apr. 26, 1989, now abandoned, by Bennett, et al., entitled "A Method for Manipulating Elements Within a Structured Document Using Active Intent Interpretation," assigned to the IBM Corporation, and incorporated herein by reference.

U.S. patent application Ser. No. 344,342, filed Apr. 26, 1989, to Lim, et al., now abandoned, entitled "A Method for Copying a Marked Portion of a Structured Document," assigned to the IBM Corporation and incorporated herein by reference.

U.S. patent application Ser. No. 344,343, filed Apr. 26, 1989, to Lim, et al., now U.S. Pat. No. 5,140,521, entitled "A Method for Deleting a Marked Portion of a Structured Document," assigned to the IBM Corporation and incorporated herein by reference.

OBJECTS OF THE INVENTION

It is therefore an object of the invention to provide a system for editing a structured document which enables modification of emphasis characteristics without requiring the user to have a detailed understanding of a document structure.

It is another object of the invention to provide a system for editing a structured document which enables the modification of emphasis characteristics for multiple forms of emphasis applied to a marked area at the same time, without requiring a detailed understanding of document structure.

It is still a further object of the invention to provide a system for editing a structured document to enable modification of emphasis characteristics to remove the forms of emphasis from a marked area at the same time, without requiring a detailed understanding of document structure.

It is still a further object of the invention to provide a system for editing a structured document to enable modification of emphasis characteristics so that multiple forms of emphasis can be added to a marked area at the same time without requiring a detailed understanding of document structure.

It is yet a further object of the invention to provide a system for editing a structured document to enable modification of emphasis characteristics, which will automatically display which types of emphasis are valid for a particular parent structure containing a marked area, and which forms of emphasis already exist within the marked area, without requiring a detailed understanding of document structure.

SUMMARY OF THE INVENTION

These and other objects, features and advantages are accomplished by the invention disclosed herein.

A data processing system and method are disclosed for editing a text document stored as an alphanumeric string of structured document text and displayed as WYSIWYG text. The invention enables changing emphasis characteristics of a marked area of the WYSIWYG text located within a parent structure of the document. The method invention includes the step of storing begin and end locations in an alphanumeric string, of a marked area and storing a type for a parent structure within which the marked area is located. Then, the method performs the step of looking up the parent structure type in a table of emphasis types to determine which of the emphasis types are valid emphasis types for the parent structure. The method then locates a first emphasis type begin tag proximate to the begin location for said marked area and determines if a corresponding end tag is proximate to the end location for said marked area. The method classifies the first emphasis type as present in the marked area if the determining step is satisfied. The method will then repeat the locating, determining and classifying steps for any additional emphasis begin tags proximate to the begin location for the marked area. Then, in accordance with one aspect of the invention, the method displays an emphasis menu of the valid emphasis types, indicating which ones thereof are present in the marked area.

In another aspect of the invention, the method enables deleting an emphasis type from the marked area by accessing the values representing the locations of the begin and end tags thereof and deleting the begin and end tags from the alphanumeric string at the locations thereof. The method will then remove the displayed present indication in the emphasis menu corresponding to the emphasis type deleted from the marked area in the deleting step.

In still another aspect of the invention, the method enables adding an emphasis type to the marked area by accessing the values representing the begin and end locations of the marked area and inserting additional begin and end tags thereof in the alphanumeric string proximate to the begin and end locations, respectively, of the marked area. The method will then display a present indication in the emphasis menu corresponding to the emphasis type added to the marked area in the adding step.

The invention can be characterized as a data processing apparatus, as well as a method.

BRIEF DESCRIPTION OF THE DRAWINGS

These and other objects, features and advantages of the invention can be more fully appreciated with reference to the accompanying figures.

FIG. 2 is an image of the structured document text and data partition 112 in the memory 106.

DESCRIPTION OF THE BEST MODE FOR CARRYING OUT THE INVENTION

Figure 1:
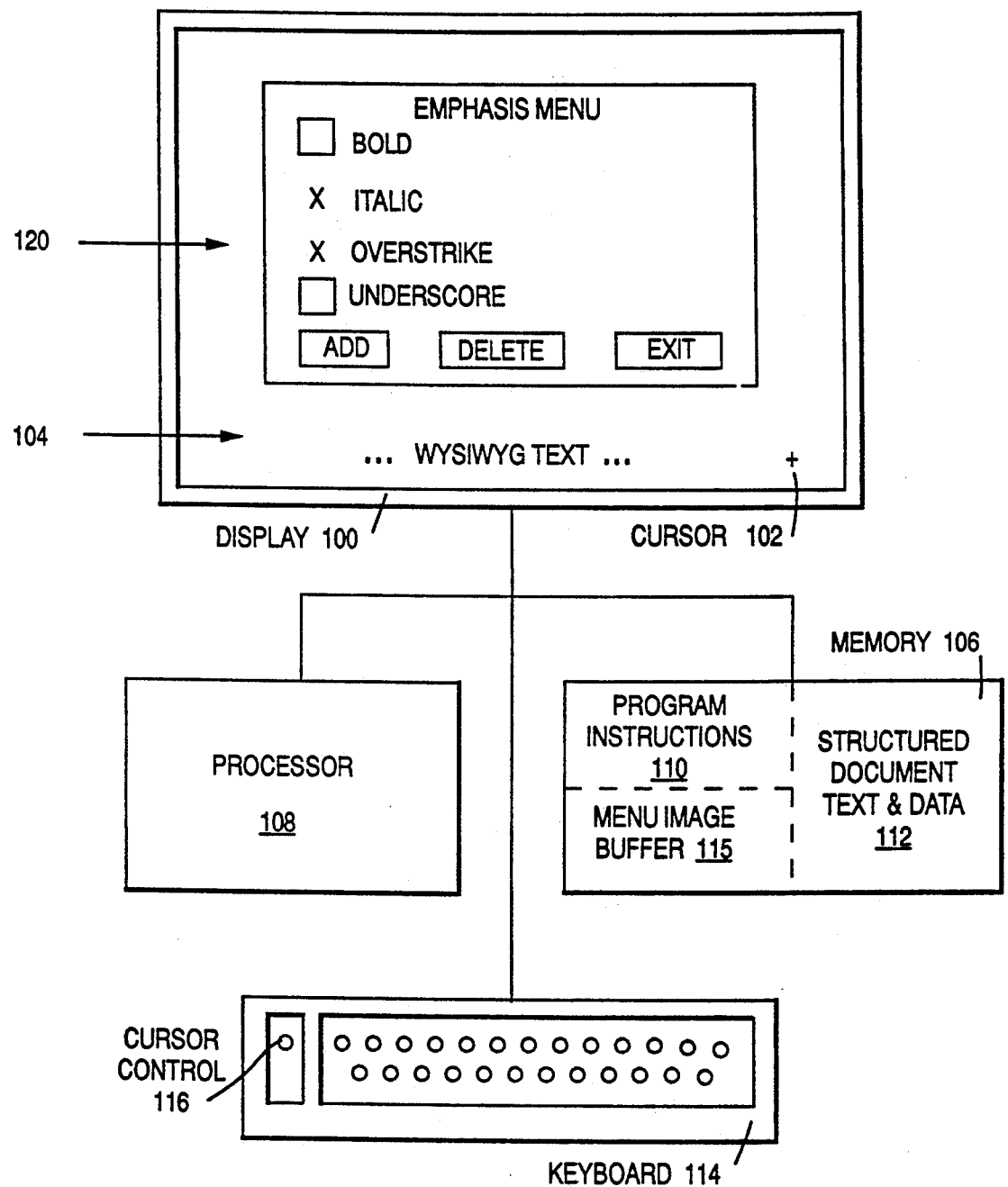
FIG. 1 is an architectural diagram of the system for editing a structured document to modify emphasis characteristics.

In order to more to more fully appreciate the features of the invention, a series of definitions will be provided as follows.

SGML

Standardized General Markup Language. A markup language consisting of tags used to prepare structured documents. Refer to International Standards Organization standard 8879-1986 for definition and details.

STRUCTURED DOCUMENT

A document prepared in accordance with an SGML-compliant type definition.

ELEMENT

SGML-defined entity consisting of a begin tag and its content, and including an end tag, when necessary.

CURRENT DOCUMENT POSITION

The document position which determines the focal point for an editing operation.

CURRENT ELEMENT

The innermost document element which contains the current document position. This refers to the lowest level child element within the element structure which contains the current document position. For example, in a document where the current document position exists within a List Item which is a child of a List within a Paragraph, the current element is known as the List Item (even though the document position is within all three elements), as it is the lowest level child element.

MARKED AREA

A marked area is an area of the document which has been selected by the user for special processing—the selected area is "highlighted" as a way to give visual feedback to the user during the selection process. Many functions may then be invoked upon that marked area including Delete (to delete the selected area from the document), Move and Copy (to move/copy the contents of the selected area to another location within the document) and Inserting/Deleting elements from around the selected area (as explained within this disclosure).

ELEMENTS WHICH EXIST AROUND A MARKED AREA

An element exists around a marked area when that element's begin tag is proximate the beginning of the marked area and the element's end tag is proximate the end of the marked area. In short, this means that the boundaries of the element match the boundaries of the marked area.

INSERTING ELEMENTS AROUND A MARKED AREA

When a user intends to emphasis a phrase within a document, the user must place the begin tag for an emphasis type of element (Bold, for instance) at the start of the phrase and the element's end tag at the end of the phrase. Everything in between the start tag and end tag will then be displayed with the appropriate emphasis. To facilitate this process, the user may mark an area (thus effectively setting the starting and ending points of the phrase to be emphasized) and have the emphasis tags inserted at the boundaries of the marked area. This is referred to as inserting elements around a marked area, or sometimes referred to as "Tagging" the marked area.

DELETING ELEMENTS FROM AROUND A MARKED AREA

When an element is deleted from around a marked area, the begin and end tags are removed from the document without disturbing any of the document's contents in between. This is also commonly referred to as Untagging. This allows, as an example, to remove the begin and end tags for a Bold element without disturbing the text in between to effectively remove the bold highlighting of a phrase without removing the phrase itself.

Figure 3:
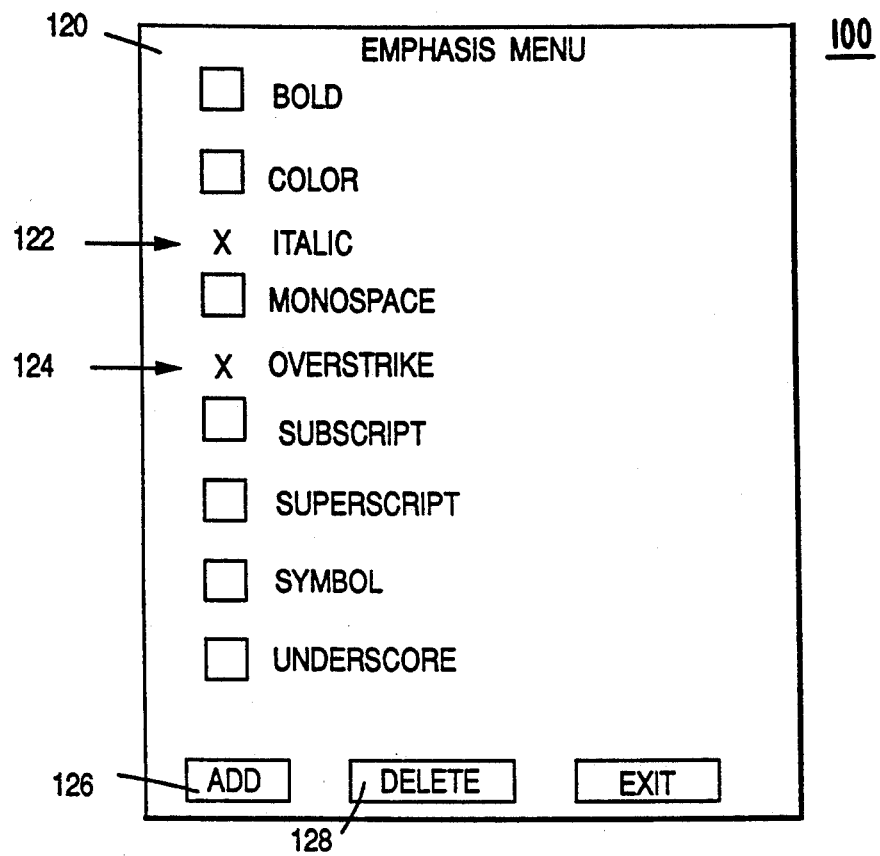
FIG. 3 illustrates the appearance of a first emphasis menu displayed for emphasis in a paragraph structure.
Figure 4:
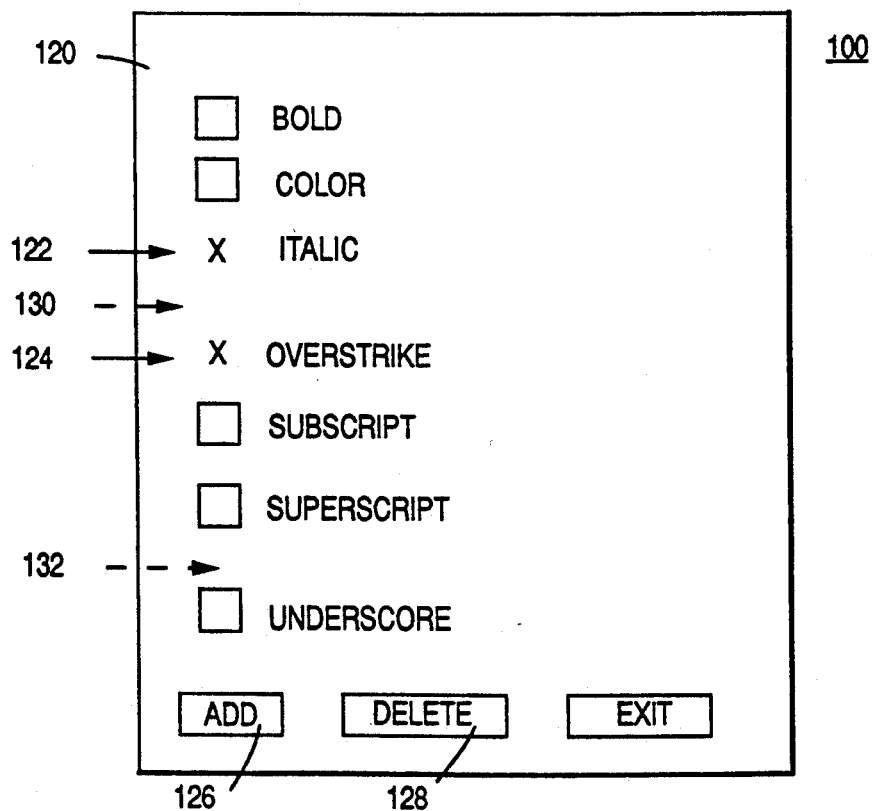
FIG. 4 illustrates a second form of an emphasis menu for emphasis in a title structure.

Turning now to FIG. 1, there is shown an architectural diagram of the system for editing a structured document to modify emphasis characteristics, in accordance with the invention. The data processing system shown in FIG. 1 includes the memory 106 for storing program instructions 110 to perform document editing functions. A processor 108 coupled to the memory 106 will execute the program instructions 110. The memory 106 will store a text document in the partition 112 as an alphanumeric string 93 shown in FIG. 2. The alphanumeric string 93 is a part of the structured document text upon which editing functions are to be performed by the processor 108 executing the program instructions 110. The keyboard 114 in FIG. 1, is coupled to the processor 108, for selecting the editing functions to be performed, using the cursor control 116, which controls the position of the cursor 102 on the display 100. The display device 100 is coupled to the processor 108, for displaying the stored text document in WYSIWYG form, 104. An emphasis menu 120 can be displayed in an overlayed form over the WYSIWYG 104 on the display 100, by actuating a key on the keyboard 114. The emphasis menu for a paragraph structure is shown in FIG. 3 and an alternate form of the emphasis menu for a title structure is shown in FIG. 4.

Figure 5A:
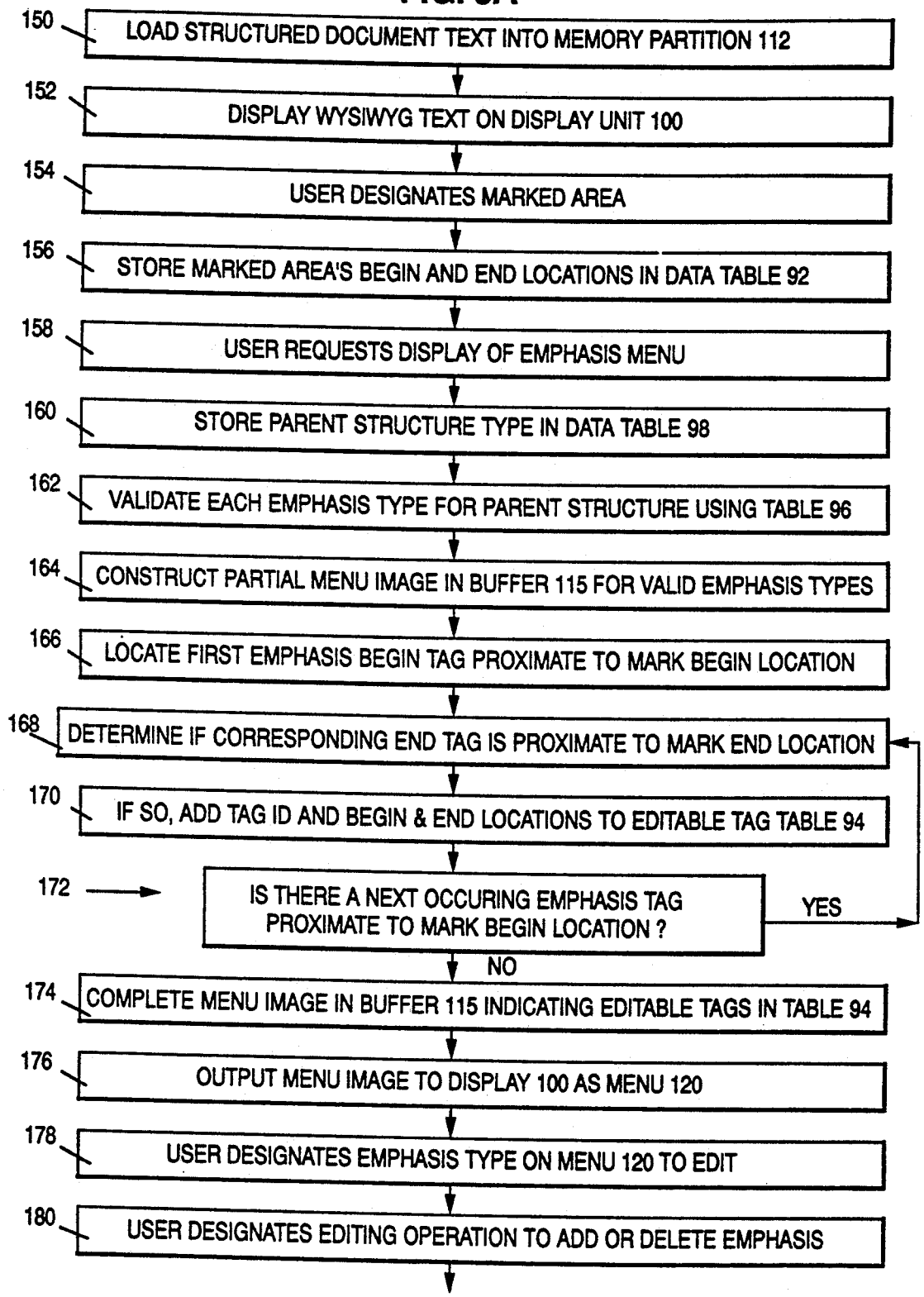
FIG. 5, consisting of FIGS. 5A and 5B, is a flow diagram of a sequence of operational steps for the method for editing a structured document to modify emphasis characteristics, in accordance with the invention.
Figure 5B:
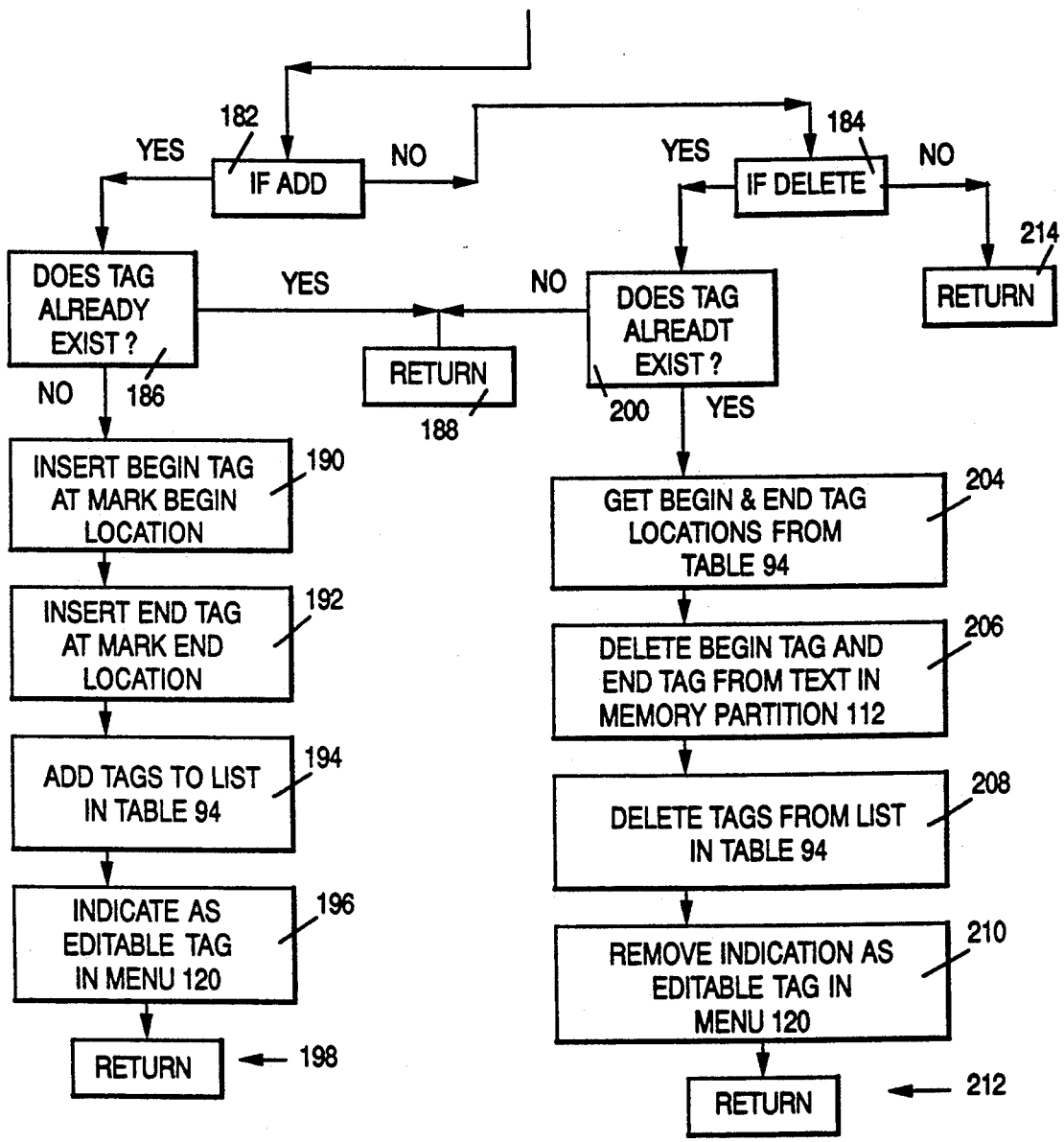
Figure 5:
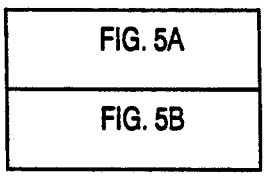

FIG. 5, consisting of FIGS. 5A and 5B, shows the sequence of operational steps for the method carried out by the program instructions 110, in accordance with the invention. Step 150 of FIG. 5, loads the structured document text 93 into the memory partition 112. Step 152, displays the WYSIWYG text 104, derived from the structured document text 93, on the display unit 100. Step 154 has the user designating the marked area 90 in the structured document text 93 by placing the cursor 102 at the beginning location 5 and then at the ending location 63 of the alphanumeric character string 93 of the structured document text.

As provided in step 156, the memory 106 stores the values of 5 and 63 in the memory partition table 92 of FIG. 2, representing the begin and end locations in the alphanumeric string 93, of the marked area 90 designated in step 154, by the keyboard 114.

Step 158 has the user requesting the display of the emphasis menu 120, in order to perform editing operations to change the emphasis in the marked area 90.

It should be noted here that the portion of the alphanumeric character string 93, which is marked with the marked area 90, lies within the paragraph structure defined by the paragraph begin tag 91 and the paragraph end tag 91' in FIG. 2. Since there may be some types of emphasis which are prohibited by the structured document architecture from appearing in a paragraph structure, the parent structure type is stored in the data table 98 of memory partition 112 in step 160. Then, in step 162, each emphasis type is validated to determine whether it is allowed to be used in the paragraph type parent structure. This is performed by looking for the parent structure type in table 96 in memory partition 112, which lists for each type of emphasis, those document structures within which the emphasis is not permitted, in accordance with the particular structured document architecture in use. A review of table 96 in FIG. 2 indicates that a paragraph structure will permit the 9 different emphasis types from bold through underscore listed in table 96. This can be distinguished from an example alternate situation wherein the parent structure begin tag 91 is a title tag and its corresponding end tag 91' is a title tag. In this case, when step 162 is performed, table 96 indicates that the emphasis types for monospace and for symbol are prohibited.

In step 164, a partial menu image can be constructed at this point in the buffer 115 of memory 106, for those valid emphasis types determined in step 162. The buffer 115 can be formed from contiguous memory elements in the memory 106, or alternately it can be considered to represent distributed portions of the memory 106 containing respective portions of the information which will be formed into the image of the emphasis menu 120. In either case, in accordance with the invention, the emphasis menu 120 will have its image dynamically assembled from only those emphasis types which are valid for the particular parent document structure 91, 91'. For example, if the parent document structure 91, 91' is a paragraph, as is indicated in FIG. 2, then the image of the emphasis menu shown in FIG. 3 will be assembled in the menu image buffer 115. Note that the emphasis menu shown in FIG. 3 contains all 9 emphasis type names from "bold" through "underscore". In the alternate example given above for a parent document structure 91, 91' being a title, the menu image being formed is illustrated in FIG. 4, wherein the prohibited mono space and symbol emphasis, 130 and 132, respectively, have been omitted from the list of emphasis types assembled for eventual display.

Step 166 in FIG. 5 has the processor 108 locating a first emphasis type tag, for example, the italic tag "I" at character location 4 of the alphanumeric string 93 in the marked area 90, at a position proximate to the begin location at character 5 for the marked area 90. This is done to determine which forms of emphasis already exist at the boundaries of the marked area. In determining whether an emphasis tag exists at the boundaries of the marked area, it must be determined that the element's begin tag is at the start of the marked area and that the element's end tag is at the end of the marked area. However, it is not required that the begin tag be exactly at the same position as the position for the start of the marked area. To do so would require that only one type of emphasis begin tag could be located at the beginning boundary of the marked area, since the mark position would exactly match the begin tag position for that one element and there would be no room for another emphasis begin tag to hold the same position. Therefore, in accordance with the invention, any begin tag which immediately precedes or follows the beginning position of a marked area is also considered to exist at the boundary of the marked area. Correspondingly, on the end tag which immediately precedes or follows the ending position of a marked area is also considered to exist at the boundary of the marked area. Thus, all emphasis types whose begin tags form a group around the beginning of the marked area and whose end tags form a group around the end of that marked area are considered to be at the boundary of the marked area, even though their positions do not exactly match the boundaries of the mark.

There is an additional complication which can take place where an italic element which begins at the beginning of the marked area ends in the middle of the marked area. In addition, a second italic element can begin further in the middle of the marked area and continue through the marked area and end at the end of the marked area. Although an italic element begin tag is found at the start of the marked area and an italic element end tag is found at the end of the marked area, this is not considered a single italic element around the boundaries of the marked area. In accordance with the invention, the requirement is enforced that the same element's begin and end tag must be at the boundaries of the marked area, in order to be considered an emphasis type present and available for editing within the marked area.

Returning to FIG. 5, step 168 has the processor 108 determining if a corresponding end tag, for example /I at character 63, is proximate to the end location at character 63 for the marked area 90. The processor 108 will classify the first emphasis type, italic for example, as present and editable in the marked area 90, if the determining step is satisfied. Step 170 will have the memory 106 storing in the table 94 of partition 112, the values representing the locations of the begin tag at character 4 and the end tag at character 63 for the italic emphasis type, in the alphanumeric string 93.

In step 172, the processor 108 will repeat the steps of locating, determining, classifying and storing for any additional emphasis begin tags proximate to the begin location for the marked area.

Then, in accordance with the invention, step 174 will complete the menu image in the buffer 115 indicating the editable tags in the table 94. Referring to FIG. 3 showing the menu to be displayed for emphasis in a paragraph structure, the italic emphasis 122 and the overstrike emphasis 124 are indicated as present and editable within the marked area 90. Then in step 176, the completed menu image of FIG. 3 is output to the display 100 as menu 120, for display. Menu 120 displays the valid emphasis types for a paragraph structure, consisting of all 9 emphasis types from "bold" through "underscore", and especially indicating the italic type 122 and the overstrike 124 as being present within the marked area 90.

The emphasis menu 120 displayed on the display 100 in response to the request by the user as an entry to the keyboard 114, includes area 126 for adding an emphasis characteristic to the marked portion 90, and a second area 128 for deleting an emphasis characteristic from the marked portion 90. The add and delete functions 126 and 128, can be selected by the user positioning the cursor 102 over the respective areas in the menu 120. Alternate techniques can employ a mouse pointer or a keyboard entry to make appropriate selections for adding or deleting the various emphasis types listed in the emphasis menu 120. In step 178, the user can designate the emphasis type on menu 120 which is to be edited. In step 180, the user designates the editing operation 126 or 128 to either add or delete the type of emphasis indicated. The user can also exit the emphasis menu 120 by appropriately selecting the exit area of the menu.

If the user had designated the marked area 90 within a parent structure 91, 19' which was alternately a title structure, then FIG. 4 represents the emphasis menu 120 which would be dynamically displayed on the display 100, omitting the prohibited monospace font and symbol types of emphasis, as discussed above.

If the user has selected a particular emphasis type from menu 120 to add to the marked area 90, step 182 of FIG. 5 will flow to step 186. Alternately, if the user has not selected the add function, step 182 will flow to step 184. If the user has selected the delete function, step 184 will flow to step 200. If the user has selected to exit from the emphasis menu 120, step 184 will flow to step 214, to return to the main program.

If the user has selected the add function, step 186 determines whether the selected tag already exists. For example, if the user had selected to add the italic from the menu shown in FIG. 3, since the italic emphasis already exists in the marked area 90, the step 186 would flow to step 188 which would return to the main program. Alternately, if the user had selected bold to be added, then step 186 would flow to step 190 where the processor 108 will add an emphasis type to the marked area 90 by accessing the values of 5 and 63 stored in table 92 in memory partition 112 of the memory 106, representing the begin and end locations of the marked area 90, and the begin and end tags for the bold emphasis type will be added at those locations in the alphanumeric string 93 at positions proximate to the begin location at character 5 and the end location at character 63, respectively, of the marked area 90. Step 190 inserts the begin tag proximate to the begin location of the marked area 90. Step 192 inserts the end tag proximate to the end location of the marked area 90.

Step 194 adds the begin location and the end location for the tags to the table 94. Then, in accordance with the invention, step 196 will have the display device 100 display a present location for the bold emphasis type in the emphasis menu 120 in response to the emphasis type (bold for this example) being added to the marked area 90 by the processor 108. Step 196 then flows to step 198 to return to the main program.

Alternately, if the user has selected to delete a mark, step 184 flows to step 200. If the mark does not already exist within the marked area 90, then step 200 flows to step 188 to return to the main program, and no changes made. Alternately, if the emphasis type already exists in the marked area 90, for example the italic emphasis type 122, then step 200 flows to step 204. In step 204, the processor accesses the values of character position 4 and character position 63 stored in table 4 corresponding to the italic emphasis 122, representing the locations of the begin tag and the end tag for the italic emphasis. Then in step 206, the italic begin tag and end tag are deleted from the alphanumeric string 93. In step 208, the identity of the italic "I" emphasis and its corresponding begin and end locations are removed from the table 94 in memory partition 112. Then, in accordance with the invention, step 210 removes the indication 122 in the emphasis menu 120 that the italic emphasis is present in the marked area 90. Then, step 210 flows to step 212 returning to the main program.

The resulting system and method for editing a structured document to modify emphasis characteristics, allows multiple forms of emphasis to be applied to a marked area at the same time without requiring a detailed understanding of the document structure. In addition, it allows multiple forms of emphasis to be removed from a marked area at the same time without requiring such detailed understanding of the document structure. And still further, the system and method determine and display for the convenience of the user, which types of emphasis currently exist at the boundaries of the marked area. The system and method automatically exclude the listing of those forms of emphasis which are prohibited by the particular structured document architecture being used by the editor program.

DETAILED DESCRIPTION OF THE OPERATION OF THE INVENTION

The following is a more detailed description of the operation of the invention on the alphanumeric character string 93 marked with the marked area 90 of FIG. 2, for identifying those emphasis types whose begin tags are grouped around the beginning of the marked area and whose corresponding end tags are grouped around the end of the marked area.

1. Locate the position within the document at which the marked area begins and call that position FIRST_TAG (the '*' represents FIRST_TAG).

```
Hi! <Underscore> <Italic>[*<Overstrike> <Color>This
is the marked area,
    </Color>only part of which is in
color.</Overstrike></Italic>]
    This is outside the mark.</Underscore>
```

2. While the position FIRST_TAG is a begin tag for an element, adjust FIRST_TAG to the position immediately preceding its current position.

```
Hi! <Underscore>*<Italic>[<Overstrike> <Color>This
is the marked area,
    </Color>only part of which is in
color.</Overstrike></Italic>]
    This is outside the mark.</Underscore>
```

```
Hi! *<Underscore> <Italic>[<Overstrike> <Color>This
is the marked area,
    </Color>only part of which is in
color.</Overstrike></Italic>]
    This is outside the mark.</Underscore>
```

3. Next, for each begin tag around the start of the marked area, we must determine if its corresponding end tag exists around the end of the marked area.

Locate the position within the document at which the marked area ends and call that position FIRST_END_TAG (the '@' represents FIRST_END_TAG).

```
Hi! *<Underscore> <Italic>[<Overstrike> <Color>This
is the marked area,
    </Color>only part of which is in
color.</Overstrike></Italic>]@
```

```
    This is outside the mark.</Underscore>
```

While the position FIRST_END_TAG is an end tag for an element, adjust FIRST_END_TAG to the position immediately preceding its current position.

```
Hi! *<Underscore> <Italic>[<Overstrike> <Color>This
is the marked area,
    </Color>only part of which is in
color.</Overstrike>@</Italic>]
    This is outside the mark.</Underscore>
```

```
Hi! *<Underscore> <Italic>[<Overstrike> <Color>This
is the marked area,
    </Color>only part of which is in
color.@</Overstrike></Italic>]
    This is outside the mark.</Underscore>
```

Locate the end tag which corresponds the first begin tag (i.e. Underscore end tag) and call that position FOUND_END_TAG (marked with the '&'):

```
Hi! *<Underscore> <Italic>[<Overstrike> <Color>This
is the marked area,
    </Color>only part of which is in
color.@</Overstrike></Italic>]
    This is outside the mark.&</Underscore>
```

Now move FIRST_END_TAG ('@') forward, one position at a time until either it matches the position of FOUND_END_TAG ('&') or no more end tags are found:

```
Hi! *<Underscore> <Italic>[<Overstrike> <Color>This
is the marked area,
    </Color>only part of which is in
color.@</Overstrike></Italic>]
    This is outside the mark.@</Underscore>
```

```
Hi! *<Underscore> <Italic>[<Overstrike> <Color>This
is the marked area,
    </Color>only part of which is in
color.</Overstrike>@</Italic>]
    This is outside the mark.&</Underscore>
```

```
Hi! *<Underscore> <Italic>[<Overstrike> <Color>This
is the marked area,
    </Color>only part of which is in
color.</Overstrike></Italic>]@
    This is outside the mark.&</Underscore>
```

At this point we find that none of the end tags around the end of the marked area matches the end tag for the underscore element. Thus, we do not consider the underscore element to be at the boundaries of the marked area and default the underscore selection within the menu to not present in marked area.

Move the FIRST_TAG position forward one position.

```
Hi! <Underscore>*<Italic>[<Overstrike> <Color>This
is the marked area,
    </Color>only part of which is in
color.</Overstrike></Italic>]@
    This is outside the mark.</Underscore>
```

4. Continue this process for each element at the beginning of the marked area until no more begin tags are found. An additional example is added for the next element (Italic):

Locate the position within the document at which the marked area ends and call that position FIRST_END_TAG (the '@' represents FIRST_END_TAG).

```
Hi! <Underscore>*<Italic>[<Overstrike><Color>This
is the marked area,
    </Color>only part of which is in
color.</Overstrike></Italic>]@
    This is outside the mark.</Underscore>
```

While the position FIRST_END_TAG is an end tag for an element, adjust FIRST_END_TAG to the position immediately preceding its current position.

```
Hi! <Underscore>*<Italic>[<Overstrike><Color>This
is the marked area,
    </Color>only part of which is in
color.</Overstrike>@</Italic>]
    This is outside the mark.</Underscore>
```

```
Hi! <Underscore><Italic>[<Overstrike><Color>This
is the marked area,
    </Color>only part of which is in
color.@</Overstrike></Italic>]
    This is outside the mark.</Underscore>
```

Locate the end tag which corresponds to the begin tag (i.e. Italic end tag) and call that position FOUND_END_TAG (marked with the '&'):

```
Hi! <Underscore>*<Italic>[<Overstrike><Color>This
is the marked area,
    </Color>only part of which is in
color.@</Overstrike>&</Italic>]
    This is outside the mark.</Underscore>
```

Now move FIRST_END_TAG ('@') forward, one position at a time until either it matches the position of FOUND_END_TAG ('&') or no more end tags are found:

```
Hi! <Underscore>*<Italic>[<Overstrike><Color>This
is the marked area,
    </Color>only part of which is in
color.@</Overstrike>&</Italic>]
    This is outside the mark.</Underscore>
```

```
Hi! <Underscore>*<Italic>[<Overstrike><Color>This
is the marked area,
    </Color>only part of which is in
color.</Overstrike>@&</Italic>]
    This is outside the mark.</Underscore>
```

At this point we have found an end tag at the end of the marked area which matches the end tag for the current element (italic). Thus, we consider the italic element to be at the boundaries of the marked area and default the italic selection within the menu to present in the marked area.

The information acquired by this process (i.e. which elements are displayed and which are defaulted to present/not present) are saved for the later processing of the menu.

It is within the scope of the invention that the structured document text stored in memory partition 112 may not be stored as a contiguous string but may be broken up into segments stored at various locations in the memory. Further, the assembly of the emphasis menu 120 is dynamic in nature, and may not require a menu image buffer 115, but may instead be assembled "on the fly" from the information contained in Tables 2, 94, 96 and 98. Still further, the memory 106 can be a combination of a RAM memory and a disk drive with portions of program instructions and structured document text being stored in virtual memory as pages on the disk drive.

Although a specific embodiment of the invention has been disclosed, it will be understood by those having skill in the art that minor changes can be made to the specific embodiment without departing from the spirit and the scope of the invention.

What is claimed is:

1. In a data processing system for editing structured document text stored as an alphanumeric string displayed as WYSIWYG text, a method of changing undisplayed emphasis characters in said structured document text which are proximate to a marked area of the WYSIWYG text located in the structured document text, comprising the steps of:

storing in said data processing system, a first type identity for a first type emphasis character and a second type identity for a second type emphasis character in said data processing system;

storing in said data processing system, a string of structured document text containing a plurality of alphanumeric characters and which also contains a first begin tag for said first type emphasis character and a first end tag for said first type emphasis character to produce a first type emphasis in said structured document text, and which also contains a second begin tag for said second type emphasis character and a second end tag for said second type emphasis character to produce a second type emphasis in said structured document text;

storing in said data processing system, a begin mark location which identifies a first one of said alphanumeric characters where said marked area begins and storing an end mark location which identifies a second end of said alphanumeric characters where said marked area ends;

determining in said data processing system, if said first begin tag for said first type emphasis character is adjacent to said first one of said alphanumeric characters where said marked area begins and determining if said first end tag for said first type emphasis character is adjacent to said second one of said alphanumeric characters where said marked area ends, and if they are, then storing a first emphasis type flag;

determining in said data processing system, if said second begin tag for said second type emphasis character is adjacent to said first one of said alphanumeric characters where said marked area begins and determining if said second end tag for said second type emphasis character is adjacent to said second one of said alphanumeric characters where said marked area ends, and if they are, then storing a second emphasis type flag; and displaying in said data processing system said first emphasis type flag for selection by a user to edit said first type emphasis in said structured document text and displaying said second emphasis type flag for selection by a user to edit said second type emphasis in said structured document text.

2. In a data processing system for editing structured document text stored as an alphanumeric string displayed as WYSIWYG text, a method of changing undisplayed emphasis characters in said structured document text which are proximate to a marked area of the WYSIWYG text located in the structured document text, comprising the steps of:

- storing in said data processing system, a first type identity for a first type emphasis character and a second type identity for a second type emphasis character in said data processing system;
- storing in said data processing system, a string of structured document text containing a plurality of alphanumeric characters in an ordered sequence and which also contains a first begin tag for said first type emphasis character and a first end tag for said first type emphasis character to produce a first type emphasis in said structured document text, and which also contains a second begin tag for said second type emphasis character and a second end tag for said second type emphasis character to produce a second type emphasis in said structured document text;
- storing in said data processing system, a begin mark location which identifies a first one of said alphanumeric characters where said marked area begins and storing an end mark location which identifies a second one of said alphanumeric characters where said marked area ends;
- determining in said data processing system, if first begin tag for said first type emphasis character is adjacent to said first one of said alphanumeric characters and precedes it in said ordered sequence where said marked area begins and determining if said first end tag for said first type emphasis character is adjacent to said second one of said alphanumeric characters and follows it in said ordered sequence where said marked area ends, and if they are, then storing a first emphasis type flag;
- determining in said data processing system, if second begin tag for said second type emphasis character is adjacent to said first one of said alphanumeric characters and follows it in said ordered sequence where said marked area begins and determining if said second end tag for said second type emphasis character is adjacent to said second one of said alphanumeric characters and precedes it in said ordered sequence were said marked area ends, and if they are, then storing a second emphasis type flag; and
- displaying in said data processing system said first emphasis type flag for selection by a user to edit said first type emphasis in said structured document text and displaying said second emphasis type flag for selection by a user to edit said second type emphasis in said structured document text.

* * * * *